United States Patent
Ridgell et al.

(10) Patent No.: US 8,695,790 B2
(45) Date of Patent: Apr. 15, 2014

(54) FASTENING SYSTEM FOR A CONVEYOR BELT

(75) Inventors: Terral A. Ridgell, Tickfaw, LA (US);
Michael V. Piehler, Slidell, LA (US);
Kevin W. Guernsey, Slidell, LA (US);
John H. Kuchler, Jr., Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 164 days.

(21) Appl. No.: 13/251,817

(22) Filed: Oct. 3, 2011

(65) Prior Publication Data
US 2013/0081928 A1  Apr. 4, 2013

(51) Int. Cl.
*B65G 15/28* (2006.01)

(52) U.S. Cl.
USPC ................................ 198/844.2; 198/850

(58) Field of Classification Search
USPC ................................ 198/844.2, 850
See application file for complete search history.

(56) References Cited

U.S. PATENT DOCUMENTS

| | | | |
|---|---|---|---|
| 4,138,011 A | 2/1979 | Lapeyre | |
| 6,223,889 B1 | 5/2001 | Layne | |
| 7,073,662 B2 * | 7/2006 | Neely et al. | 198/850 |
| 7,210,573 B2 | 5/2007 | Mol | |
| 7,594,574 B2 | 9/2009 | Mol | |
| 7,681,717 B2 | 3/2010 | DeGroot | |
| 7,850,562 B2 | 12/2010 | DeGroot | |
| 7,987,973 B2 | 8/2011 | Broe | |
| 8,002,110 B2 * | 8/2011 | DeGroot et al. | 198/844.2 |
| 2005/0183936 A1 | 8/2005 | Neely et al. | |
| 2009/0301845 A1 * | 12/2009 | DeGroot et al. | 198/844.2 |

FOREIGN PATENT DOCUMENTS

| | | |
|---|---|---|
| DE | 202006008918 U1 | 8/2006 |
| EP | 2116487 A1 | 11/2009 |
| FR | 1 140 516 A | 7/1957 |
| WO | 2007033698 A1 | 3/2007 |
| WO | 2007090148 A2 | 8/2007 |

OTHER PUBLICATIONS

International Search Report and Written Opinion of the International Searching Authority, PCT/US2012/055206, mailed Dec. 21, 2012, European Patent Office, Rijswijk, NL.

* cited by examiner

*Primary Examiner* — Ramya Burgess
*Assistant Examiner* — Thomas Randazzo
(74) *Attorney, Agent, or Firm* — Catherine M. Bishop

(57) ABSTRACT

A fastening system for joining two ends of a conveyor belt segment includes an inhibiting surface for controlling movement of the ends relative to each other. The inhibiting surface is offset from an inner surface of a conveyor belt segment employing the fastening system and engages a surface of a corresponding conveyor belt segment to reduce tenting of the conveyor belt segment ends.

35 Claims, 9 Drawing Sheets

FASTENING SYSTEM FOR A CONVEYOR BELT

BACKGROUND

The present invention relates generally to power-driven conveyor belts, and more particularly to a system and method for connecting ends of a conveyor belt body to form an endless conveyor belt.

Low tension, direct drive conveyor belts are typically used in situations where hygiene and cleanliness are important. For example, in food processing plants such as those that process meat products for human consumption, low tension, direct drive conveyor belts are used to transport items. Sanitation is important and, therefore, the endless belts used in such conveyors are conventionally made of materials that can be hygienically cleaned, such as thermoplastics or stainless steel.

An example of a flexible endless belt suitable for implementing an illustrative embodiment of the invention is shown in FIG. 1. An endless conveyor belt 10 in a typical installation moves around two sprockets 12 and 14, drums or pulleys. A first sprocket 12 may be a drive sprocket for driving the conveyor belt, while the second sprocket may be an idle or slave sprocket 14. The belt 10 has an outer surface 110 serving as an article-conveying surface and an inner surface 22 serving as a drive surface. The inner surface 22 includes drive elements, illustrated as teeth 26, preferably spaced equidistantly from each other along the inner driven surface 22. The teeth 26 engage grooves 16 spaced around the circumference of the sprockets 12, 14 to move the belt. The upper span 11 of the belt will travel in the direction of arrow 15. The flexible belt 10 wraps around the sprocket and around a return roller, or shoe or drum, in the return path.

The belt is made of a resilient material, such as a thermoplastic polymer, an elastomer, or a rubber, and is flexible along its length.

A flexible toothed belt is normally formed by joining two ends of the belts together at a seam 112. Methods of joining two ends of the belts together include splicing, whereby splicing presses are used to weld the butt ends of the conveyor belt sections together, mechanical means, such as a hinge-pin system and/or a knuckled connector system described in US Patent Application Publication Number 2009/0301845, the contents of which are incorporated herein by reference.

The belt may have to be removed from the sprockets for maintenance of the system, for cleaning, or for repair. Removing the endless belt 10 of FIG. 1 poses an inconvenience, normally requiring disassembly of the conveyor frame, movement of the sprockets, and possibly destruction of the belt (or at least cutting the belt to be re-seamed later).

A drawback of certain mechanical means for joining together conveyor belt ends includes a hinging or "tenting" effect in the area of the seam when the belt moves around a sprocket, whereby the ends of the conveyor belt project away from the sprocket.

SUMMARY

The present invention provides a fastening system for a conveyor belt. The fastening system includes a hinge member and an inhibiting surface for controlling movement of two belt segment ends relative to each other.

In one embodiment, a fastening system for fastening conveyor belt segment ends comprises a hinge body extending longitudinally from a first end of the conveyor belt segment and a foot extending from the hinge body. The foot includes a longitudinally extending inhibiting surface, at least a portion of which is offset from the inner surface of the conveyor belt segment.

In another embodiment, a conveyor belt segment comprises a belt body and a first hinge extending from the first end of the belt body. The first hinge comprises a first arcuate convex surface extending from the outer surface of the belt body, a second arcuate convex surface extending from the inner surface of the belt body and a substantially planar surface extending substantially longitudinally between the first arcuate surface and the second arcuate surface.

According to another embodiment, a conveyor belt segment comprises a belt body having drive teeth spaced apart by a predetermined belt pitch and a hinge extending from the belt body. The hinge includes an inhibiting surface. The hinge is spaced from a drive tooth by a distance that is about one-half the belt pitch.

According to another embodiment, a conveyor belt comprises at least one belt segment, a plurality of laterally spaced hinge members extending from a first end of the belt segment and an inhibiting surface formed on a hinge member. At least a portion of the inhibiting surface is offset from the inner surface of the belt segment.

BRIEF DESCRIPTION OF THE DRAWINGS

These features of the invention, as well as its advantages, are better understood by referring the following description, appended claims, and accompanying drawings, in which:

DETAILED DESCRIPTION

Figure 1:
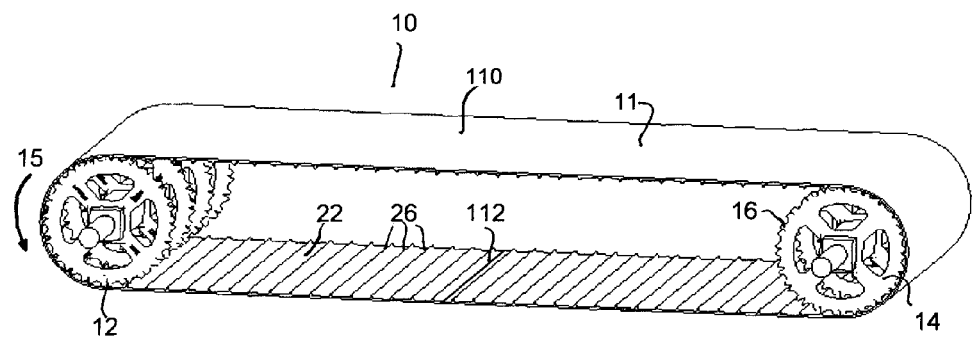
FIG. 1 illustrates an endless conveyor belt of the prior art.

The present invention provides a fastening system for facilitating assembly and disassembly of a conveyor belt. The present invention will be described below relative to an illustrative embodiment. Those skilled in the art will appreciate that the present invention may be implemented in a number of different applications and embodiments and is not specifically limited in its application to the particular embodiments depicted herein.

FIGS. 2-5 illustrate a fastening system 210 for a conveyor belt according to an illustrative embodiment of the invention. FIGS. 6-9 provide detailed views of a hinge portion 230 of the fastening system 210 according to an illustrative embodiment of the invention. As shown in FIGS. 2-5, a conveyor belt 200 may be formed by fastening two ends 201,202 of one or more belt segments 203 together at a seam 211 using the illustrative fastening system 210. Each belt segment 203 comprises a belt body that extends longitudinally from a first end 201 to a second end 202 and laterally from a right side 214 to a left side 215. The body of each belt segment 203 extends in thickness from an outer surface 216, illustrated as a conveying surface for conveying a product, to an inner surface 217. The inner surface may be a drive surface including drive elements, illustrated as teeth 219, extending therefrom. The drive elements engage sprockets, such as the sprocket 140 shown in FIG. 3, or drums that drive or guide the conveyor belt. The longitudinal direction L is the direction of belt travel when the conveyor belt 200 is implemented in a conveyor system. As shown, the teeth 219 are spaced longitudinally on the inner surface 217 by a distance P, defined as a belt pitch.

The conveyor belt 200 of the illustrative embodiment may comprise a plurality of belt segments sequentially joined together, or a single belt segment having ends joined together using the fastening system 210 to form an endless belt.

The conveyor belt 200 can be formed of any suitable material, such as a thermoplastic polymer, an elastomer, or a rubber, and is preferably flexible along its length about a lateral axis. The conveyor belt can be made from any of a number of methods, e.g., milling, extrusion, and/or injection molding.

Figure 5:
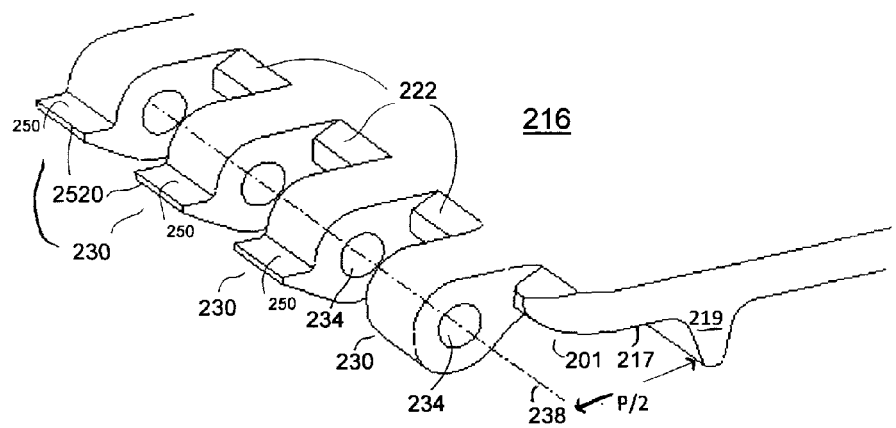
FIG. 5 is a perspective side view of an end of a portion of the fastening system of FIGS. 2 and 3.

The illustrative conveyor belt fastening system 210 includes a plurality of laterally spaced apart hinge members 230 extending longitudinally outward from a first end 201 of a belt segment 203, as shown in FIG. 5. The hinge members 230 are arranged to interleave with one or more laterally spaced hinge members 231 on the opposing belt segment end 202. Aligned openings 234 in at least some of the interleaved hinge members 230, 231 form a lateral passageway along axis 238 when the ends are interleaved. A hinge rod 236 inserted into the lateral passageway connects the first end 201 of the belt segment to a second end 202 of a belt segment at the seam 211, forming an endless belt or an extended belt segment.

In one embodiment, the hinge members 230, 231 may be formed on a separate or intermediate belt segment adapted to be spliced or otherwise connected to an end of a conveyor belt segment. Alternatively, the hinge members 230, 231 may be formed directly on an end of a conveyor belt segment.

As shown in FIG. 5, the outer surface 216 of a belt segment 203 may include recesses 222 between the hinge members 230. The illustrative recesses are formed by beveling or chamfering the outer surface 216 towards the first end 201 of the belt body. The recesses 222 prevent or reduce protrusion of the belt outer surface as the belt flexes around a sprocket or other device in a conveyor system.

Figure 6:
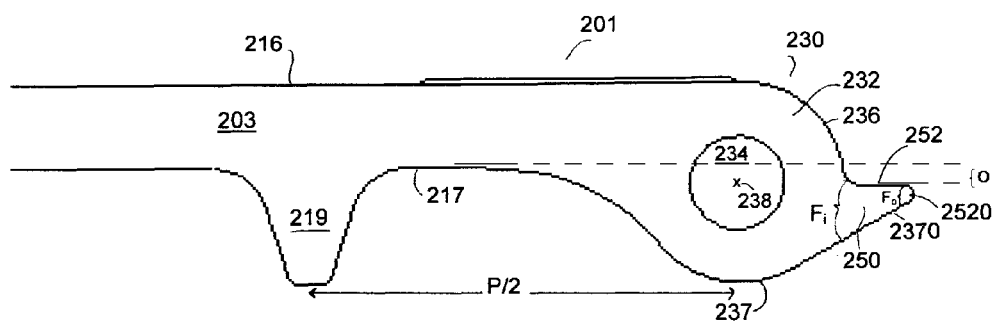
FIG. 6 is a detailed side view of a hinge member of a fastening system for a conveyor belt according to an illustrative embodiment of the invention.

FIG. 6 is a detailed side view of an embodiment of a hinge member 230 in a fastening system according to an illustrative embodiment of the invention. The illustrative hinge member comprises a hinge body 232 extending from a first end 201 of the belt segment 203. The hinge body 232 may be substantially cylindrical and may include lateral opening 234 formed in the body for receiving a hinge rod. The lateral opening 234 may be in the center of the body 232, or off-center. The lateral opening 234 extends along an axis 238 that is preferably substantially parallel to the end 201 of the belt segment 203.

Figure 2:
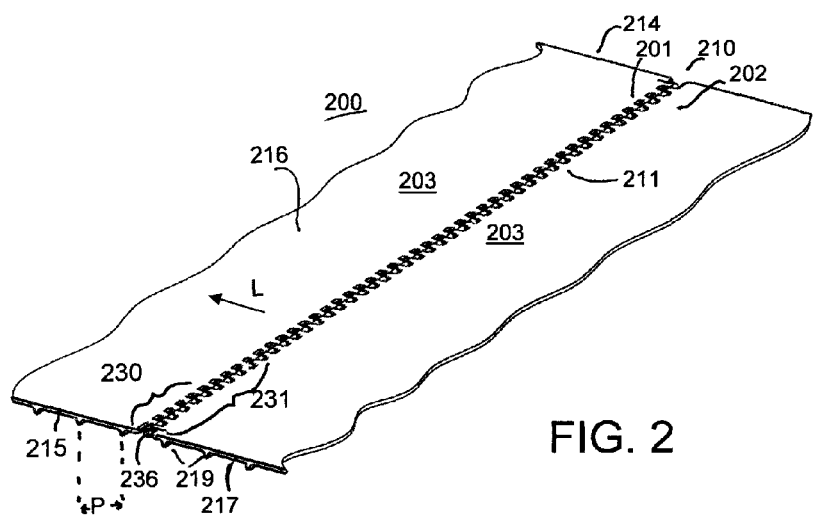
FIG. 2 is a perspective top view of an assembled fastening system for a conveyor belt embodying features of the invention.
Figure 3:
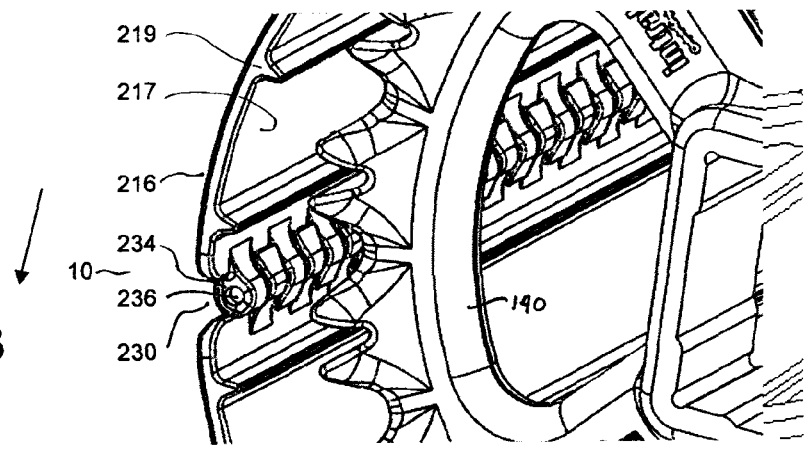
FIG. 3 is a perspective bottom view a sprocket and conveyor belt employing a fastening system of an embodiment of the invention.

The center of the hinge bodies 232, defined by axis 238, is spaced from a tooth 219 of the conveyor belt segment by a distance that is about half the belt pitch (P/2). When the fastening system 210 is assembled, the seam 211 is thus formed between two teeth 219 of the conveyor belt, as shown in FIGS. 2 and 3. The conveyor belt formed using the fastening system 200 may be used with a sprocket having recesses between grooves to accommodate the seam 211.

The hinge member 230 further includes a foot 250 extending longitudinally from the hinge body 232 for controlling the movement of the first end 201 of a belt segment relative to a second end of a belt segment when the fastening system 210 is assembled. The illustrative foot 250 comprises a protrusion extending from the hinge body 232 and includes an inhibiting surface 252 that is offset from the inner surface 217 of the belt segment by a selected distance O. As used herein, the term "offset" denotes a surface that is spaced away from the inner surface 217 of the belt segment and that is not coplanar with the body of the belt segment. In contrast, the term "inset" connotes a surface that is coplanar with the upper surface 216, the lower surface 217, or another plane within the body of the belt segment 203.

Figure 10:
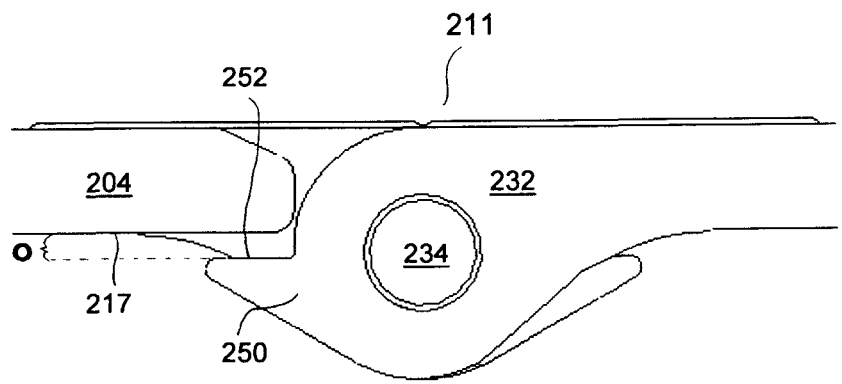
FIG. 10 is a detailed side view of an assembled fastening system embodying features of the invention.
Figure 11:
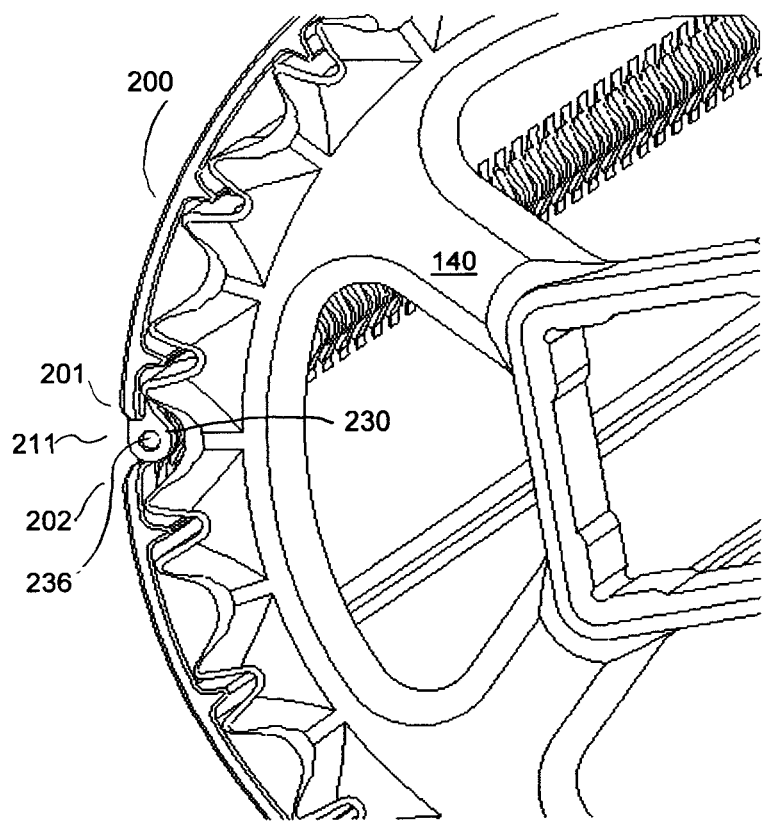
FIG. 11 illustrates a conveyor belt employing a fastening system of an embodiment of the invention as the conveyor belt wraps around a sprocket.

When the hinge bodies 230, 231 of corresponding belt segment ends are interleaved, the foot 250 is spaced from the inner surface 217 of the corresponding belt segment by the offset distance O, as shown in FIG. 10. The foot inhibiting surface 252 prevents or otherwise limits tenting of the belt as the belt moves around a sprocket 140 or other device, as shown in FIG. 11. As the belt wraps around a sprocket 14, the hinge members 230, 231 tend to flex relative to each other about the hinge rod 236. The inhibiting surface 252 engages the inner surface 217 of an opposing belt segment to limit the rotation and tenting of the ends 201, 202. The initial clearance between the inhibiting surface 252 and the opposing inner surface 217 facilitates assembly of the fastening system as well as limited flexing of the hinge members.

In the embodiment of FIG. 6, the axis 238 of the hinge body 232 is also offset from the inner surface 217 of the belt segment, though the invention is not limited to the illustrative position of the hinge body axis 238. The inhibiting surface 252 is also offset from the axis 238, causing the axis 238 to be located between the inhibiting surface 252 and the inner surface 217.

In the embodiment shown in FIG. 6, the foot 250 is integrally formed with the hinge body 232. Alternatively, the foot 250 may be separately formed and thereafter coupled to the hinge body 232.

In the embodiment of FIGS. 6-9, the hinge body 232 is substantially cylindrical to facilitate cleaning of the seam 211 and wrapping of the conveyor belt 200 around a sprocket. The illustrative hinge body 232 comprises an outer convex arcuate surface 236 extending from the outer surface 216 of the belt segment. The illustrative outer arcuate surface 236 extends toward the inner surface 217 through an arc that is about 90°. The illustrative hinge body 232 further comprises an inner arcuate surface 237 extending from the inner surface 217 of the belt segment. The inner arcuate surface 237 terminates at a longitudinal end 2370 that is longitudinally outward of the outer arcuate surface 236. The inhibiting surface 252 of the foot extends between the surfaces 236, 237.

As shown, the inner arcuate surface 237 defines an inner surface of the foot 250, though the foot 250 may be separately formed from the inner arcuate surface 237. The inner arcuate surface and the inhibiting surface 252 intersect at the longitudinal end 2370 to form a tapered edge 2520 extending laterally, shown in FIGS. 5 and 6. The illustrative foot 250 thus has a wedge-shaped cross-section, tapering in thickness from a first thickness $F_i$ to a second thickness $F_o$ at the edge 2520. The tapered edge 2520 provides flexibility in the foot 250 when the belt wraps around a sprocket or bends at another place in a conveyor system. Alternatively, an intermediate surface may connect the inhibiting surface 252 to the inner arcuate surface 237 or the outer arcuate surface 236.

Figure 4:
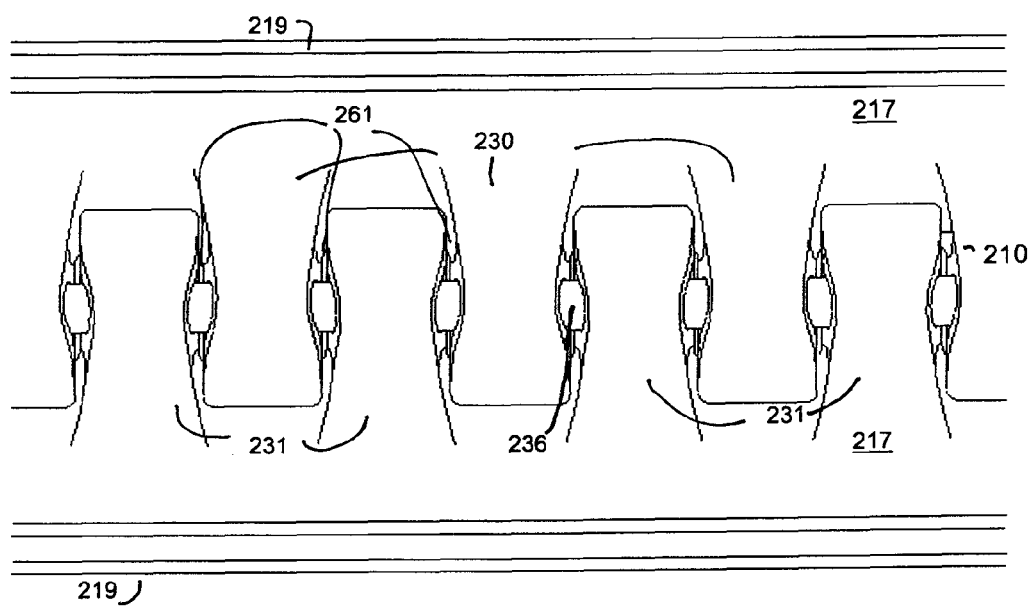
FIG. 4 is a bottom view of an assembled fastening system of an embodiment of the invention.
Figure 7:
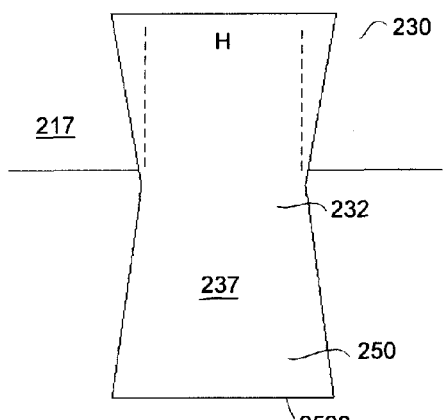
FIG. 7 is a bottom view of the hinge member of FIG. 6.
Figure 8:
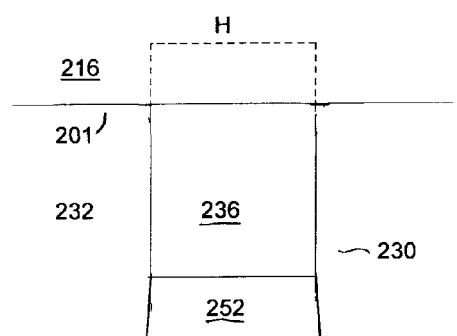
FIG. 8 is a top view of the hinge member of FIG. 6.

Referring to FIGS. 4, 7 and 8, the inner arcuate surface 237 and the inhibiting surface 252 may flare out from the hinge body region, such that the edge 2520 is wider than the lateral length H of the hinge body 232. As shown in FIG. 7, the inhibiting surface 252 may be narrower in an inner portion closest to the hinge body 232 and expand in width to a wider outer portion at the edge 2520. The widened contour increases the contact area of the inhibiting surface 252 with an opposing bottom surface 217 of a belt end. Alternatively, the inhibiting surface 252 may have a consistent contour.

Figure 9:
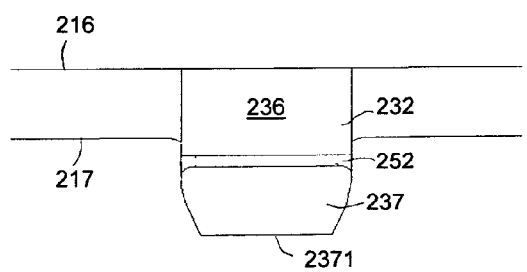
FIG. 9 is a front view of a hinge member according to an embodiment of the invention.

As shown in FIG. 9, the hinge body 232 may taper towards the inner portion of the fastening system, forming a relatively narrow portion at the inner apex 2371 of the surface 237. When assembled, the interleaved hinge members 230, 231 thus form openings 261, shown in FIG. 4, between adjacent hinge bodies 232 to expose the rod 236 and facilitate cleaning of the seam.

Figure 12:
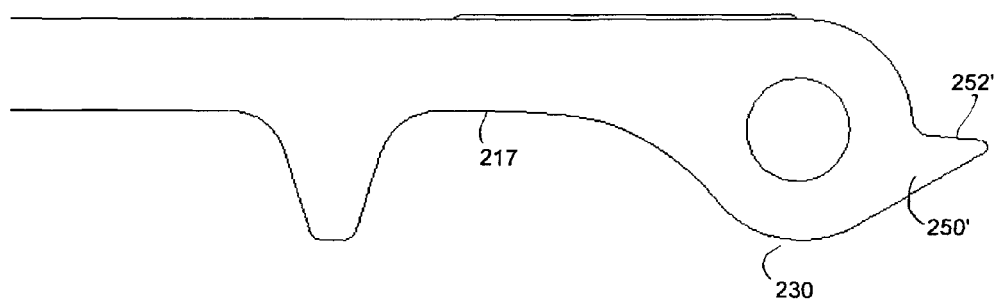
FIG. 12 illustrates an alternate embodiment of a hinge member for a fastening system.

In the embodiment of FIG. 6, the inhibiting surface 252 is substantially parallel to the inner surface 217 of the conveyor belt segment 203. Alternatively, the inhibiting surface may be skewed relative to the inner surface. For example, as shown in FIG. 12, the inhibiting surface 252' of the hinge member foot 250' may slope away from the bottom surface 217 of the belt segment, allowing a small amount of rotation of the belt ends 201, 202 relative to each other before the inhibiting surface 252' engages the bottom surface 217 of a corresponding belt end to limit further movement of the two ends relative to each other.

Figure 13:
FIG. 13 illustrates another embodiment of a hinge member for a fastening system.

In addition, while the foot 250 shown in FIG. 5 has a wedge-shaped cross-section, one skilled in the art will recognize that the foot 250 may have any suitable cross-section. For example, as shown in FIG. 13, a foot 250" for a fastening system of another embodiment of the invention may have a substantially rectangular, square, semi-circular, or other shaped cross-section including an inhibiting surface 252" for controlling movement of corresponding members of the fastening system.

Figure 14:
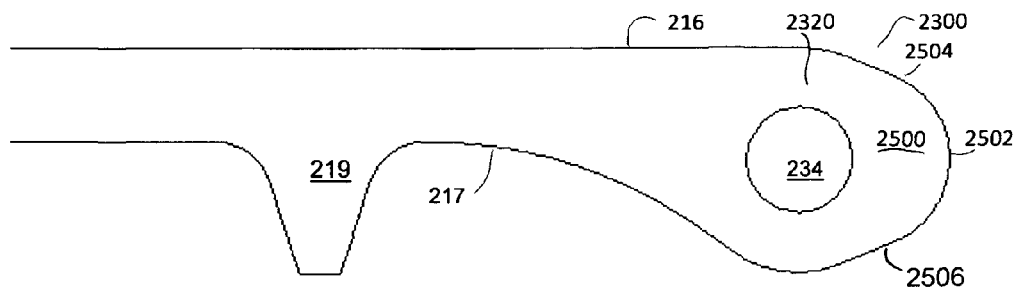
FIG. 14 is a side view of a hinge member for a fastening system according to another embodiment of the invention.
Figure 15:
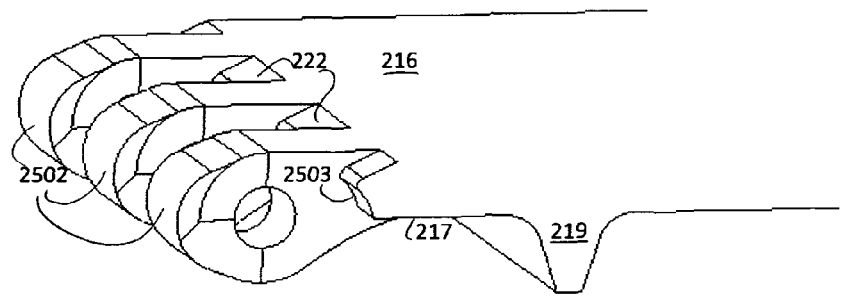
FIG. 15 is a perspective view of a portion of a fastening system employing the hinge member of FIG. 14.
Figure 16:
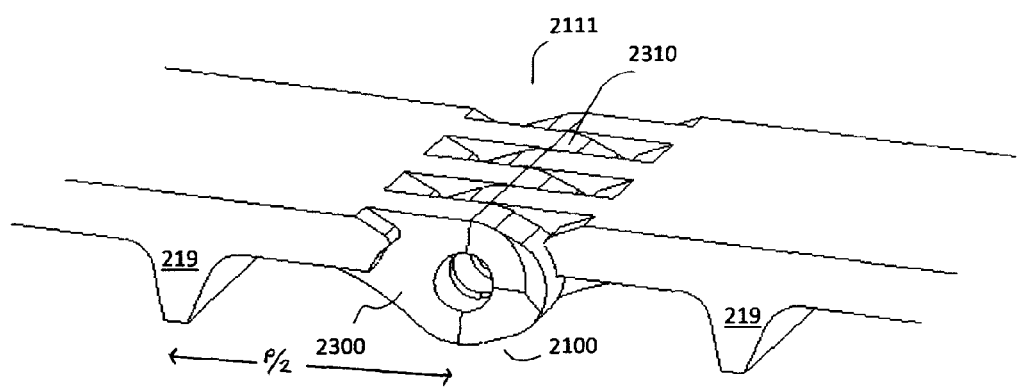
FIG. 16 illustrates an assembled fastening system employing the hinge member of FIG. 14.

FIG. 14-16 illustrate another embodiment of a fastening system including an inhibiting surface to control movement of two hinge members relative to each other.

In the embodiment of FIGS. 14-16, a hinge member 2300 includes a non-concentric foot 2500 extending from the hinge body 2320. The foot 2500 includes an inhibiting surface 2502 that controls rotation of the mating hinge members in two directions. The non-concentric foot 2500 engages a corresponding cutout 2503 on an opposing end of a belt segment to inhibit rotation to the belt segment ends and force the fastening system to flex when the belt bends outward. The illustrative cutouts comprise arcuate surfaces between corresponding hinge members 2310. The illustrative inhibiting surface 2502 is arc-shaped and extends from an outer end 2504 that is coplanar with the body of the belt segment (between outer surface 216 and inner surface 217) to an inner end 2506 that is offset from the inner surface 217 of the belt segment. As shown, the hinge member 2300 including the non-concentric foot 2500 is spaced from a drive tooth 219 by a distance that is about one-half the belt pitch, such that the seam 2111 of the fastening system 2100 is located between two teeth 219 when assembled, as shown in FIG. 16.

Figure 17:
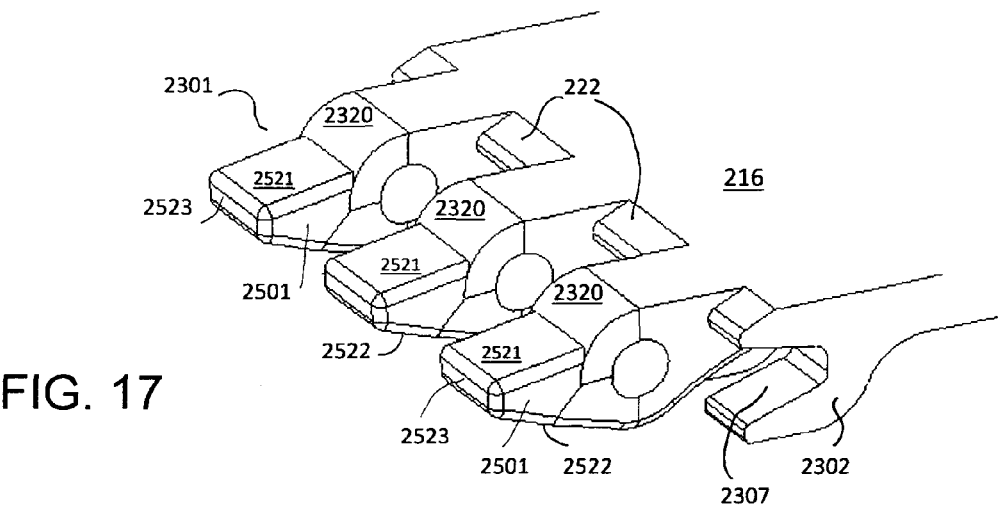
FIG. 17 is a perspective view of a portion of a fastening system according to another embodiment of the invention.
Figure 18:
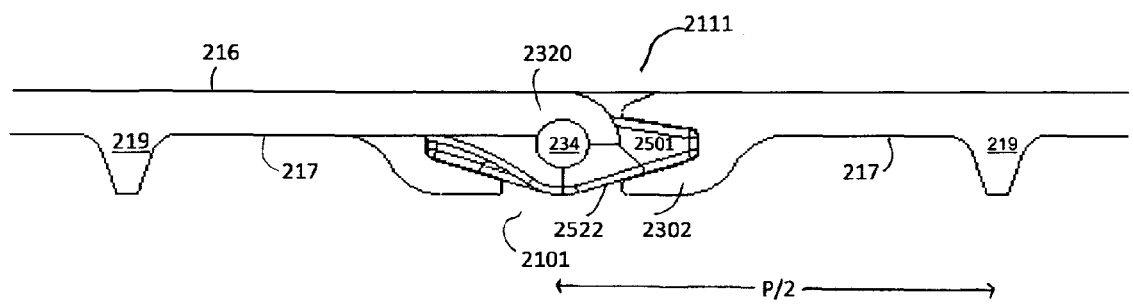
FIG. 18 is a side view of a fastening system employing the hinge members shown in FIG. 17.
Figure 19:
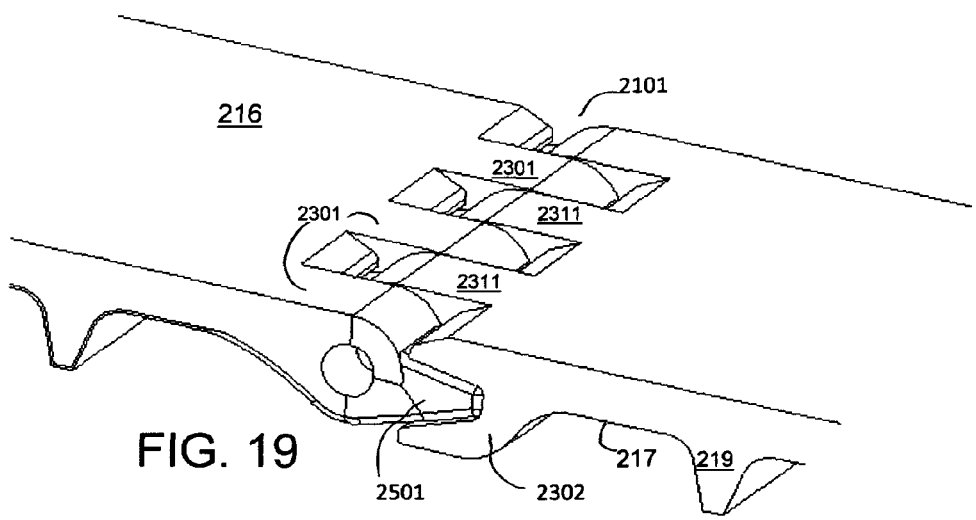
FIG. 19 is a perspective view of the fastening system of FIG. 18.

In another embodiment of the invention, shown in FIGS. 17-19, a hinge member for a fastening system includes a positive engagement feature that locks into a receiving feature on a corresponding belt segment end. In the embodiment of FIGS. 17-19, a fastening system 2101 for a conveyor belt includes hinge members 2301 extending from a first end of a belt segment end and configured to engage corresponding hinge members 2311 on a second end of a belt segment end. At least one hinge member 2301 includes a foot 2501 extending from a hinge body 2320. The foot 2501 comprises two opposing inhibiting surfaces 2521, 2522 extending at an angle relative to the outer and inner surfaces 216, 217. A front surface 2523 may extend between the inhibiting surfaces 2521, 2522 and form the front of the foot 2501. Each belt segment end further includes receiving features 2504 between hinge members 2301 for receiving the foot 2501 of a hinge member on a corresponding belt segment end. The illustrative receiving feature 2301 is formed in a bulge 2302 formed in the end 201 of a belt segment. The receiving feature 2301 comprises a recess in the bulge 2302 that is sized, shaped and positioned to receive the foot 2501. The opposing inhibiting surfaces control rotation of the hinge bodies relative to each other, and force the fastening system to flex in both an inward and outward direction. As shown, the inner inhibiting surface 2522 is preferably offset from the inner surface 217 of the belt segment, while the outer inhibiting surface 2511 may be coplanar with the body of the belt segment (between the inner surface 217 and the outer surface 216) The hinge member 2301 including the foot 2501 is spaced from a drive tooth 219 by a distance that is about one-half the belt pitch, such that the seam 2111 of the fastening system 2100 is located between two teeth 219 when assembled, as shown in FIG. 18.

Figure 20:
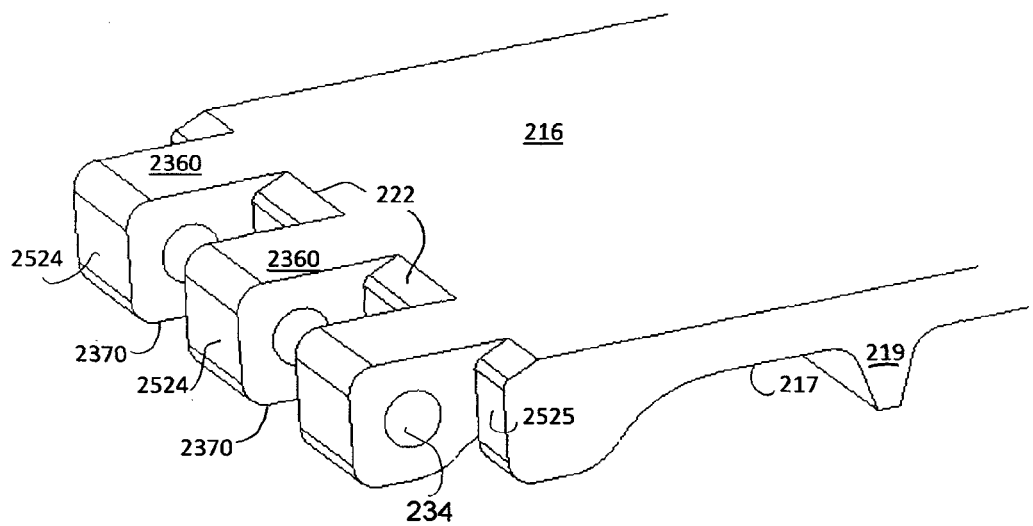
FIG. 20 is a perspective view of a portion of a fastening system according to another embodiment of the invention.
Figure 21:
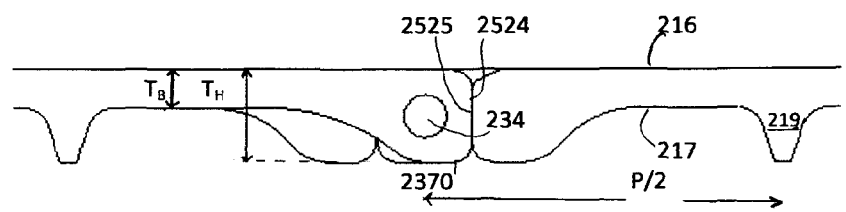
FIG. 21 is a side view of a fastening system employing the hinge members shown in FIG. 20.
Figure 22:
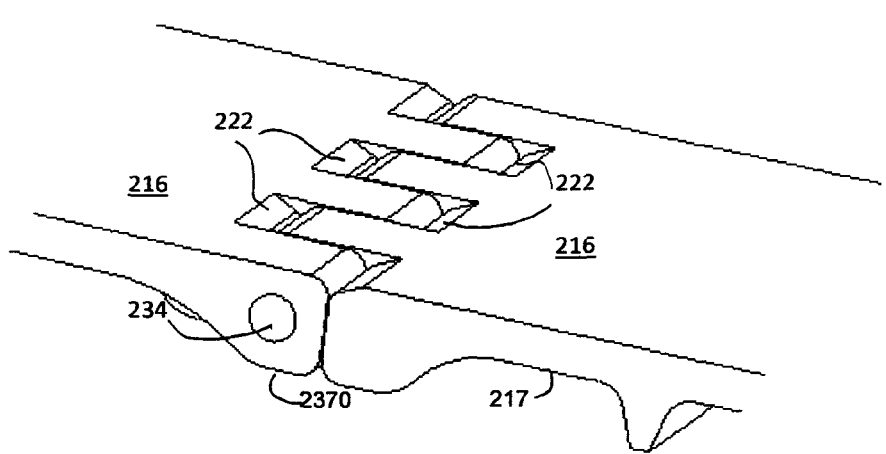
FIG. 22 is a perspective view of the fastening system of FIG. 20.

In still another embodiment of the invention, shown in FIGS. 20-22, an inhibiting surface for preventing or reducing tenting of belt segments ends may be formed on a polygonal hinge member. In the embodiment of FIGS. 20-22, a fastening system for conveyor belt segments includes polygonal hinge members 2310 extending longitudinally outward from a first end 201 of a belt segment 203. The illustrative hinge members 2310 have a substantially square-shaped cross section. The outer surface 2360 of the hinge member 2310 extends from and is coplanar to the outer surface 216 of the belt segment. The inner surface 2370 of the hinge member 2310 extends inwards from the inner surface 217 of the belt segment, such that the thickness of the hinge $T_h$ is greater than the thickness of the belt body $T_b$. An inhibiting surface 2524 extends between the surfaces 2360, 2370, with the inner portion of the inhibiting surface 2524 disposed inwards of the inner surface 217 of the belt segment. Each inhibiting surface 2524 is configured to abut and engage a corresponding inhibiting surface 2525 formed adjacent to a hinge member on a corresponding belt segment end when the fastening system is assembled. In the embodiment of FIGS. 20-22, the inhibiting surfaces 2524 and 2525 are substantially planar and extend perpendicular to the outer surface 216 and inner surface 217 of the belt segment. The interference between surfaces 2524 and 2525 force the seam 2111 to flex in both an outward and inward direction. The hinge member 2310 is spaced from a drive tooth 219 by a distance that is about one-half the belt pitch, such that the seam 2111 of the fastening system 2100 is located between two teeth 219 when assembled, as shown in FIGS. 21 and 22.

The scope of the claims is not meant to be limited to the details of the described exemplary embodiments.

What is claimed is:

1. A fastening system for fastening a first end of a conveyor belt segment to a second end of a conveyor belt segment, comprising:
    a hinge body extending longitudinally from a first end of a conveyor belt segment, wherein the conveyor belt segment has an outer surface and an inner surface; and
    a foot extending from the hinge body, wherein the foot includes a longitudinally extending inhibiting surface at least a portion of which is offset from the inner surface of the conveyor belt segment in a direction away from the outer surface.

2. The fastening system of claim 1, wherein the hinge body includes a lateral opening extending along a lateral axis for receiving a retaining rod.

3. The fastening system of claim 2, wherein the inhibiting surface is offset from the lateral axis of the hinge body.

4. The fastening system of claim 1, wherein the hinge body is substantially cylindrical.

5. The fastening system of claim 1, wherein the inhibiting surface is substantially parallel to the inner surface of the conveyor belt segment.

6. The fastening system of claim 1, wherein the foot tapers from the hinge body to form a tapered edge extending laterally relative to the first end of the conveyor belt segment.

7. The fastening system of claim 1, wherein the inhibiting surface has a lateral width that is greater than a lateral width of the hinge body.

8. The fastening system of claim 1, wherein the hinge body and the foot are formed of a flexible thermoplastic material.

9. The fastening system of claim 1, wherein the inhibiting surface is substantially arcuate.

10. The fastening system of claim 1, further comprising an inhibiting surface formed on the foot that is inset from the inner surface of the conveyor belt segment.

11. The fastening system of claim 1, further comprising a receiving feature adjacent to the hinge body for engaging an interfering surface on a second end of a conveyor belt segment.

12. The fastening system of claim 1, wherein the inhibiting surface is substantially perpendicular to the outer surface and the inner surface of the conveyor belt segment.

13. A conveyor belt segment, comprising:
    a belt body including an outer surface and an inner surface, the belt body extending longitudinally from a first end to a second end; and
    a first hinge member extending from the first end of the belt body, the first hinge member comprising a first arcuate convex surface extending from the outer surface of the belt body and terminating in a straight outer edge below the outer surface to define an upper hinge surface, a second arcuate convex surface extending from the inner surface of the belt body and terminating in a straight outer edge below the inner surface to define a lower hinge surface and a substantially planar surface extending substantially longitudinally between the straight outer edge of the first arcuate surface and the straight outer edge of the second arcuate surface.

14. The conveyor belt segment of claim 13, wherein the planar surface of the first hinge member is offset from the inner surface of the belt body in a direction away from the outer surface.

15. The conveyor belt segment of claim 13, wherein the planar surface of the first hinge member is substantially parallel to the inner surface of the belt body.

16. The conveyor belt segment of claim 13, wherein the planar surface widens in a lateral direction from a first width adjacent the first arcuate surface to a second width adjacent the second arcuate surface.

17. The conveyor belt segment of claim 13, wherein the second arcuate surface and the substantially planar surface intersect to form a tapered edge.

18. The conveyor belt segment of claim 13, further comprising a second hinge member laterally spaced from the first hinge and extending from the first end of the belt body, the first and second hinge members adapted to interleave with corresponding mating hinge members on a second end of a conveyor belt segment.

19. The conveyor belt segment of claim 13, wherein the first hinge member further includes a lateral opening for receiving a retaining rod.

20. The conveyor belt segment of claim 13, wherein the belt body is flexible about a lateral axis.

21. A conveyor belt segment, comprising:
    a belt body extending longitudinally from a first end to a second end and including an outer surface and an inner surface having formed thereon a plurality of drive teeth spaced apart by a predetermined belt pitch,
    a hinge member extending from the first end of the belt body, the hinge member including an inhibiting surface for interfering with a surface of a mating conveyor belt segment to limit movement of the conveyor belt segment relative to the mating conveyor belt segment, wherein the hinge member is spaced from a drive tooth by a distance that is about one-half the belt pitch.

22. The conveyor belt segment of claim 21, wherein the hinge member comprises a hinge body extending from the first end of the belt body and a foot extending from the hinge body on which the inhibiting surface is formed.

23. The conveyor belt of claim 22, wherein the foot tapers to form a tapered edge extending in a lateral direction relative to the belt body.

24. The conveyor belt segment of claim 22, wherein the hinge body is substantially cylindrical.

25. The conveyor belt segment of claim 22, wherein the hinge body has a lateral width and the foot has a lateral width that is wider than the lateral width of the hinge body.

26. The conveyor belt segment of claim 21, wherein the inhibiting surface is offset from the inner surface of the belt body.

27. The conveyor belt segment of claim 21, wherein the inhibiting surface is perpendicular to the outer surface and the inner surface.

28. The conveyor belt segment of claim 21, wherein the inhibiting surface is arcuate.

29. A conveyor belt, comprising:
    at least one belt segment, each belt segment extending in a longitudinal direction from a first end to a second end and having an outer surface and an inner surface,
    a plurality of laterally spaced hinge members extending from the first end; and an inhibiting surface formed on a hinge member, wherein at least a portion of the inhibiting surface is offset from the inner surface of the belt segment in a direction away from the outer surface.

30. The conveyor belt of claim 29, wherein the second end of the belt segment includes a plurality of laterally space hinge members adapted to interleave with the laterally spaced hinge members of the first end.

31. The conveyor belt of claim 30, further comprising a hinge rod for coupling the laterally spaced hinge members of the first end to the laterally spaced hinge members of the second end.

32. The conveyor belt of claim 31, wherein the inhibiting surface engages the inner surface on the second end of the belt segment when the conveyor belt bends about the first end and the second end to inhibit rotation of the first end relative to the second end.

33. The conveyor belt of claim 29, wherein the hinge members are substantially cylindrical.

34. The conveyor belt of claim 29, wherein the inhibiting surface is formed on a foot extending from the hinge member.

35. The conveyor belt of claim 29, wherein the inhibiting surface is parallel to the inner surface of the belt segment.

* * * * *